United States Patent
Lyu

(10) Patent No.: US 7,379,143 B2
(45) Date of Patent: May 27, 2008

(54) LIQUID CRYSTAL DISPLAY HAVING PREDETERMINED STEEPNESS OF LIGHT TRANSMITTANCE WITHIN A PREDETERMINED RANGE ON LIGHT TRANSMITTANCE GRADIENT FOR IMPROVED VISIBILITY

(75) Inventor: Jae-Jin Lyu, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 561 days.

(21) Appl. No.: 11/023,641

(22) Filed: Dec. 29, 2004

(65) Prior Publication Data

US 2005/0179631 A1 Aug. 18, 2005

(30) Foreign Application Priority Data

Dec. 30, 2003 (KR) .................. 10-2003-0100067

(51) Int. Cl.
*G02F 1/1337* (2006.01)
(52) U.S. Cl. .......................... 349/130; 349/43
(58) Field of Classification Search .......... 349/43, 349/130
See application file for complete search history.

(56) References Cited

U.S. PATENT DOCUMENTS 5,126,865 A * 6/1992 Sarma ................... 349/85
5,576,858 A * 11/1996 Ukai et al. ............. 349/42
5,748,276 A * 5/1998 Uno et al. ............. 349/144
6,936,845 B2 * 8/2005 Kim et al. ............. 257/59
7,119,870 B1 * 10/2006 Nishikawa et al. .... 349/125
2004/0070713 A1 * 4/2004 Song .................... 349/129

* cited by examiner

*Primary Examiner*—David Nelms
*Assistant Examiner*—John Heyman
(74) *Attorney, Agent, or Firm*—Cantor Colburn LLP

(57) ABSTRACT

A liquid crystal display is provided, which includes: a first panel including a first signal line, a second signal line intersecting the first signal line, a thin film transistor connected to the first and the second signal lines, and a pixel electrode connected to the thin film transistor and including a first subpixel electrode having a first voltage and a second subpixel electrode capacitively coupled to the first subpixel electrode and having a second voltage; a second panel including a common electrode facing the pixel electrode and supplied with a common voltage; and a vertically aligned liquid crystal layer that is interposed between the pixel electrode and the common electrode, wherein a steepness of light transmittance as function of a voltage applied the first subpixel electrode with respect to the common voltage is lower than about 20.

34 Claims, 11 Drawing Sheets

LIQUID CRYSTAL DISPLAY HAVING PREDETERMINED STEEPNESS OF LIGHT TRANSMITTANCE WITHIN A PREDETERMINED RANGE ON LIGHT TRANSMITTANCE GRADIENT FOR IMPROVED VISIBILITY

BACKGROUND OF THE INVENTION

1. Field of the Invention

The present invention relates to a liquid crystal display.

2. Description of Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in absence of electric field, is spotlighted because of its high contrast ratio and wide reference viewing angle that is defined as a viewing angle making the contrast ratio equal to 1:10 or as a limit angle for the inversion in luminance between the grays.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the VA mode LCD has relatively poor lateral visibility compared with front visibility. For example, a patterned VA (PVA) mode LCD having the cutouts shows an image that becomes bright as it goes far from the front, and in the worse case, the luminance difference between high grays vanishes such that the images cannot be perceived.

In addition, the cutouts and the protrusions reduce the aperture ratio. In order to increase the aperture ratio, the size of the pixel electrodes is suggested to be maximized. However, the close distance between the pixel electrodes causes strong lateral electric fields between the pixel electrodes, which dishevels orientations of the LC molecules to yield textures and light leakage, thereby deteriorating display characteristic.

SUMMARY OF THE INVENTION

A liquid crystal display is provided, which includes: a first panel including a first signal line, a second signal line intersecting the first signal line, a thin film transistor connected to the first and the second signal lines, and a pixel electrode connected to the thin film transistor and including a first subpixel electrode having a first voltage and a second subpixel electrode capacitively coupled to the first subpixel electrode and having a second voltage; a second panel including a common electrode facing the pixel electrode and supplied with a common voltage; and a vertically aligned liquid crystal layer that is interposed between the pixel electrode and the common electrode, wherein a steepness of light transmittance as function of a voltage applied the first subpixel electrode with respect to the common voltage is lower than about 20.

An absolute magnitude of a first subpixel voltage defined as the first voltage relative to the common voltage may be higher than an absolute magnitude of a second subpixel voltage defined as the second voltage relative to the common voltage.

The liquid crystal display may further include a third subpixel electrode capacitively coupled to the first and the second subpixel electrodes and having a third voltage.

An area of the first subpixel electrode may be equal to or smaller than half of an area of the second and the third subpixel electrodes.

An absolute magnitude of each of the second subpixel voltage and a third subpixel voltage defined as the third voltage relative to the common voltage may be in a range of about 60-95% of an absolute magnitude of the first subpixel voltage.

The second and the third subpixel electrodes may occupy an area equal to or smaller than about 80% of an area of the pixel electrode.

A ratio of an area of each of the second and the third subpixel electrodes relative to an area of the first subpixel electrode may be about 1-5.

The liquid crystal display may further include a coupling electrode connected to the first subpixel electrode and overlapping the second and the third subpixel electrodes for forming the capacitive coupling.

The coupling electrode may have first and second portions overlapping the second and the third subpixel electrodes, respectively, and the first and the second portions of the coupling electrode may have different widths.

Overlapping areas between the coupling electrode and the second and the third subpixel electrodes may be different.

The liquid crystal display may further include a fourth subpixel electrode capacitively coupled with the first to the third subpixel electrodes and having a fourth voltage.

Relative value of a sum of the first subpixel voltage and the third subpixel voltage and a sum of the second subpixel voltage and a fourth subpixel voltage defined as the fourth voltage relative to the common voltage may be in a range of about 80-100%.

The liquid crystal display may further include a coupling electrode connected to the first subpixel electrode and overlapping the second to the fourth subpixel electrodes for forming the capacitive coupling.

The coupling electrode may have first to third portions overlapping the second to the fourth subpixel electrodes, respectively, and the first to the third portions of the coupling electrode may have different widths.

Overlapping areas between the coupling electrode and the second to the fourth subpixel electrodes may be different.

The second signal line may include a curved portion including at least two rectilinear portions alternately arranged with making clockwise and counterclockwise angles with the first signal line.

The pixel electrode may have a shape of curved stripes that is curved at least twice and the first subpixel electrode and the second subpixel electrode may be divided at curved portions of the pixel electrode.

The pixel electrode and the common electrode may include a tilt direction determining member curved following the shape of the pixel electrode.

The liquid crystal display may further include a storage electrode line that extends substantially parallel to the first signal line and includes a storage electrode overlapping the pixel electrode.

A liquid crystal display is provided, which includes: a first panel including a first signal line, a second signal line intersecting the first signal line, a thin film transistor connected to the first and the second signal lines, and a pixel electrode connected to the thin film transistor and including a first subpixel electrode and a plurality of second subpixel electrodes separated from each other and capacitively coupled to the first subpixel electrode; a second panel including a common electrode facing the pixel electrode and supplied with a common voltage; and a vertically aligned liquid crystal layer that is interposed between the pixel electrode and the common electrode, wherein the first and the second subpixel electrodes have first and second subpixel voltages relative to the common voltage and the second subpixel voltages have different voltage ratios with respect to the first subpixel voltage.

An absolute magnitude of each of the second subpixel voltages may be lower than an absolute magnitude of the first subpixel voltage.

The number of the second subpixel electrodes may be two.

The first subpixel electrode may have an area equal to or smaller than an area of the second subpixel electrodes.

The absolute magnitude of each of the second subpixel voltages may be in a range of about 60-95% of an absolute magnitude of the first subpixel voltage.

The second subpixel electrodes may occupy an area equal to or smaller than about 80% of an area of the pixel electrode.

A ratio of an area of each of the second subpixel electrodes relative to an area of the first subpixel electrode may be about 1-5.

The liquid crystal display may further include a coupling electrode connected to the first subpixel electrode and overlapping the second subpixel electrodes for forming the capacitive coupling.

The coupling electrode may have a plurality of portions overlapping the second subpixel electrodes, respectively, and having different widths.

Overlapping areas between the coupling electrode and the second subpixel electrodes may be different.

The number of the second subpixel electrode may be three.

The liquid crystal display may further include a coupling electrode connected to the first subpixel electrode and overlapping the second subpixel electrodes for forming the capacitive coupling.

The coupling electrode may have a plurality of portions overlapping the second subpixel electrodes, respectively, and having different widths.

Overlapping areas between the coupling electrode and the second subpixel electrodes may be different.

A liquid crystal display is provided, which includes: a first panel including a first signal line, a second signal line intersecting the first signal line, a thin film transistor connected to the first and the second signal lines, and a pixel electrode connected to the thin film transistor and including a plurality of subpixel electrodes separated from each other; a second panel including a common electrode facing the pixel electrode and supplied with a common voltage; and a vertically aligned liquid crystal layer that is interposed between the pixel electrode and the common electrode, wherein the subpixel electrodes have different voltages and one of the second subpixel electrodes having a higher voltage has an area equal to or smaller than another of the second subpixel electrodes having a lower voltage.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
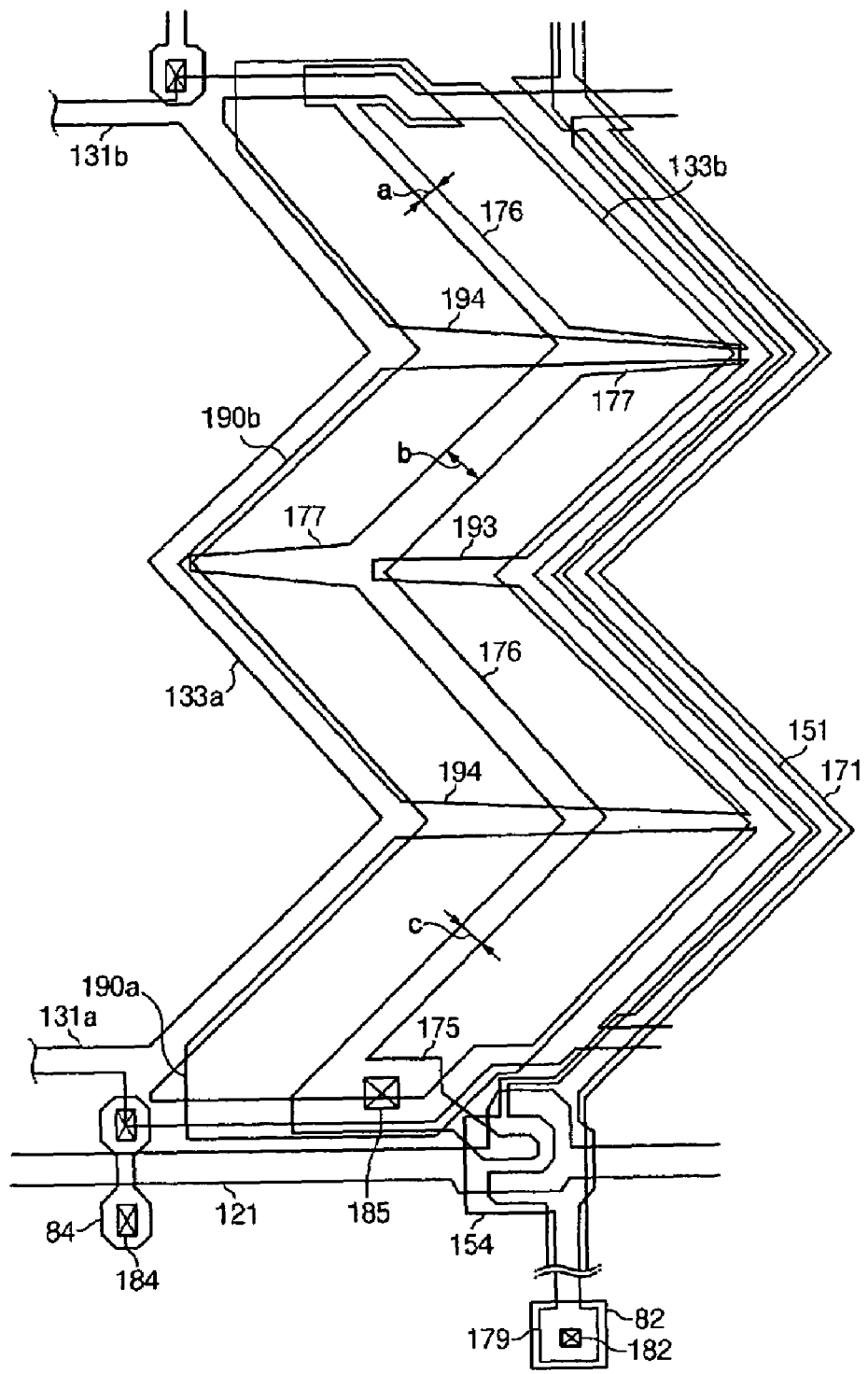
FIG. 1 is a layout view of a TFT array panel for an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays according to embodiments of the present invention will be described with reference to the accompanying drawings.

An LCD according to an embodiment of the present invention is described in detail with reference to FIGS. 1-5.

Figure 2:
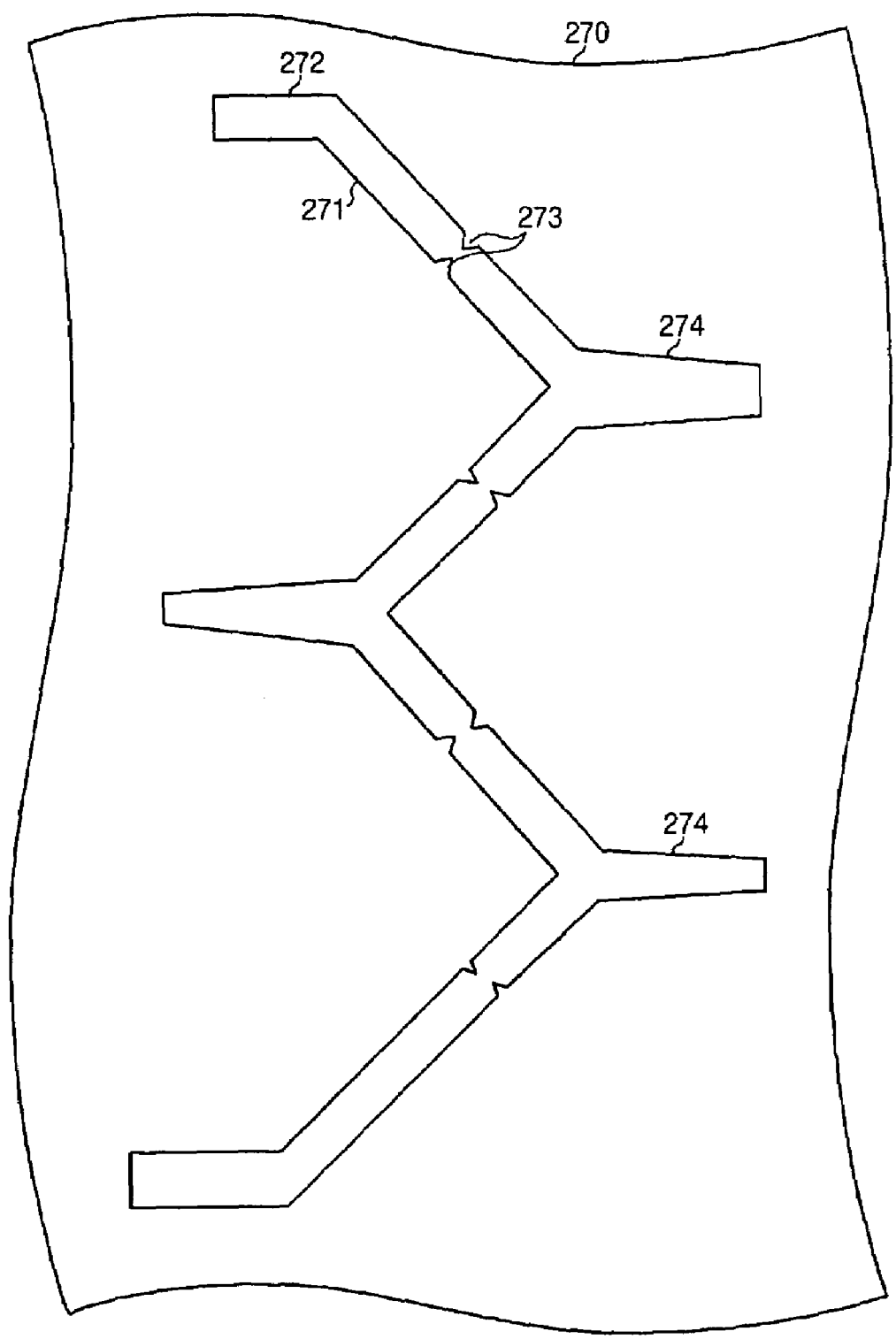
FIG. 2 is a layout view of a common electrode panel for an LCD according to an embodiment of the present invention.
Figure 3:
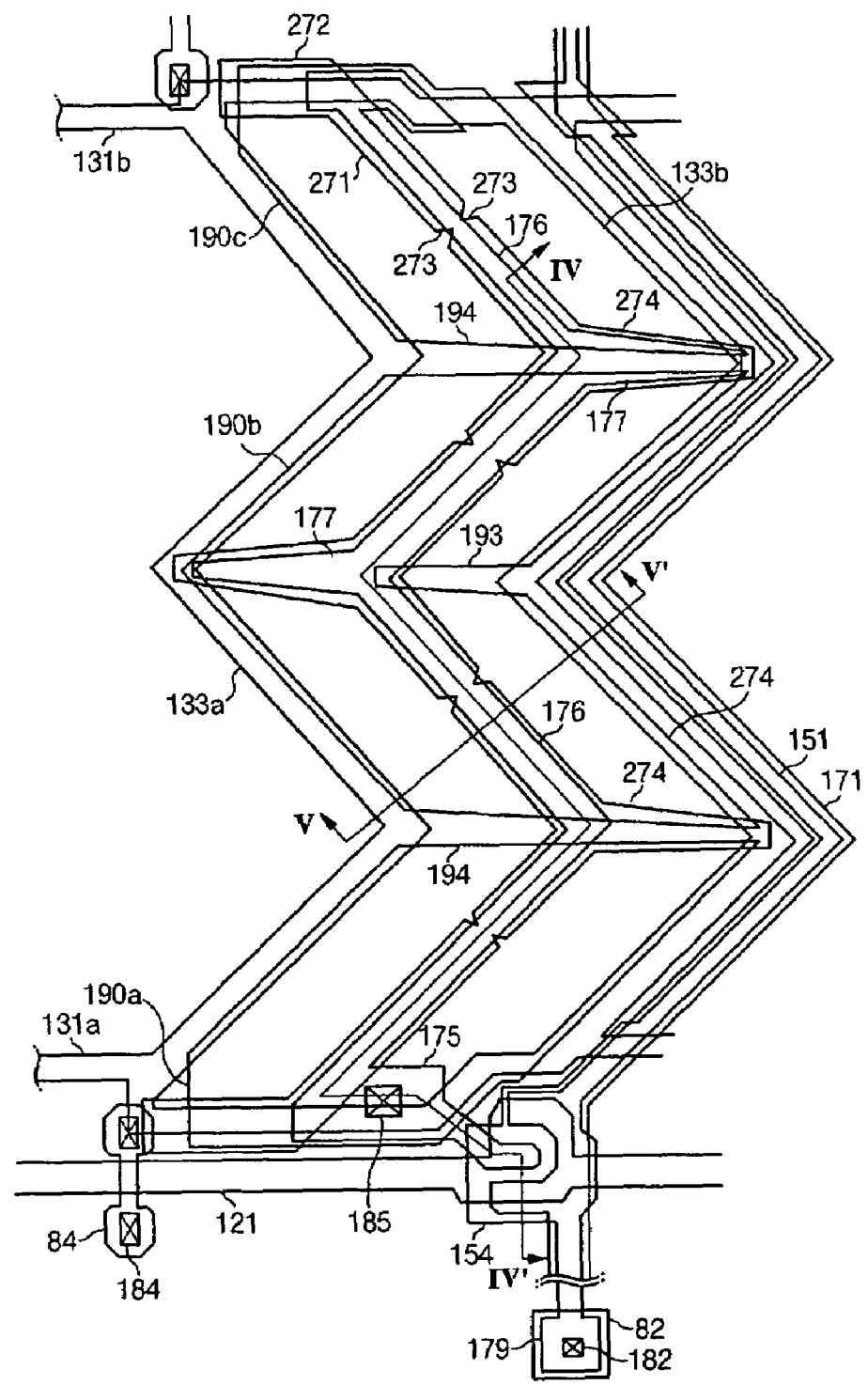
FIG. 3 is a layout view of an LCD including the TFT array panel shown in FIG. 1 and the common electrode panel shown in FIG. 2.
Figure 4:
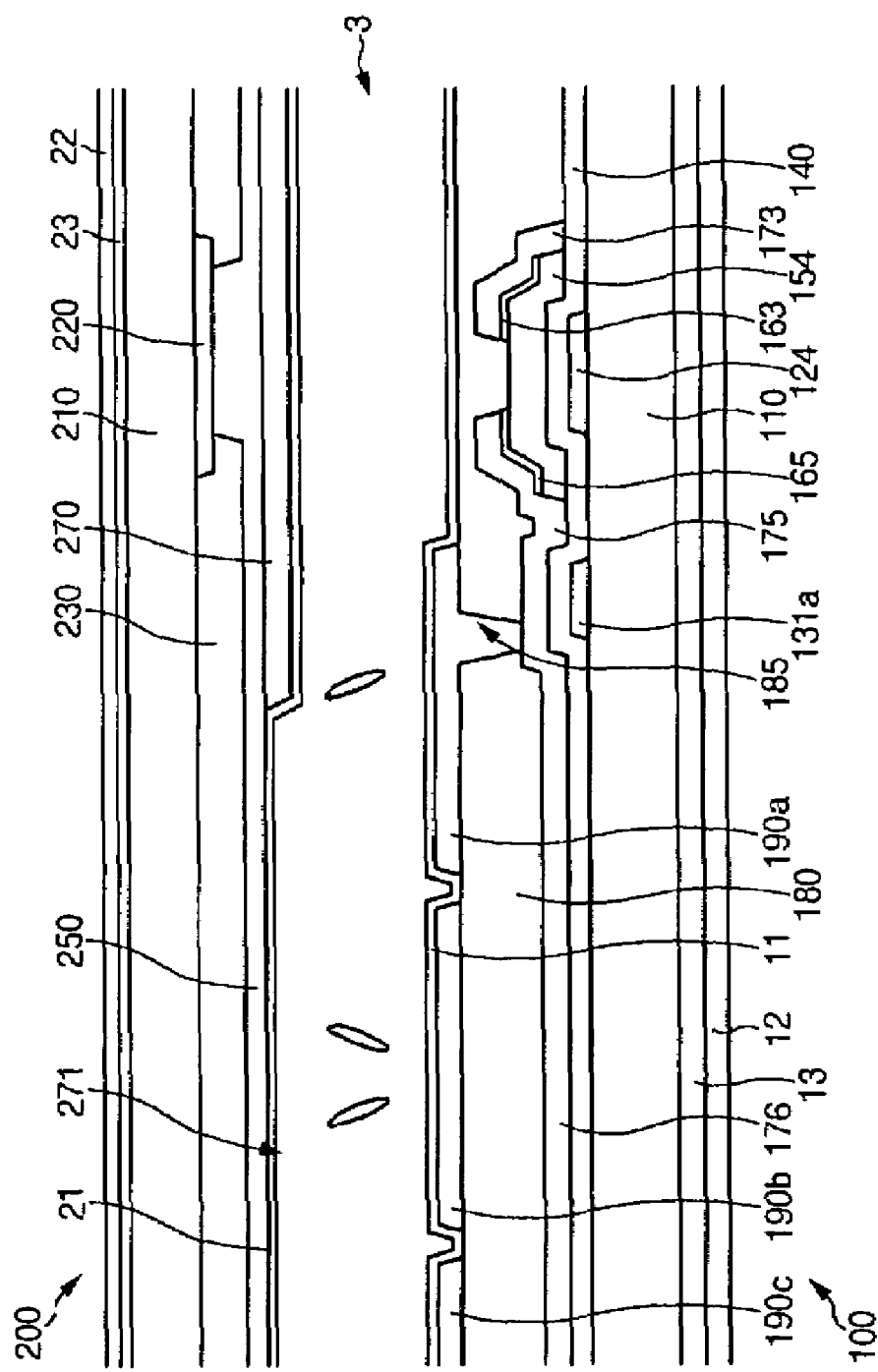
FIGS. 4 and 5 are sectional views of the LCD shown in FIG. 3 taken along the lines IV-IV' and V-V', respectively.
Figure 5:
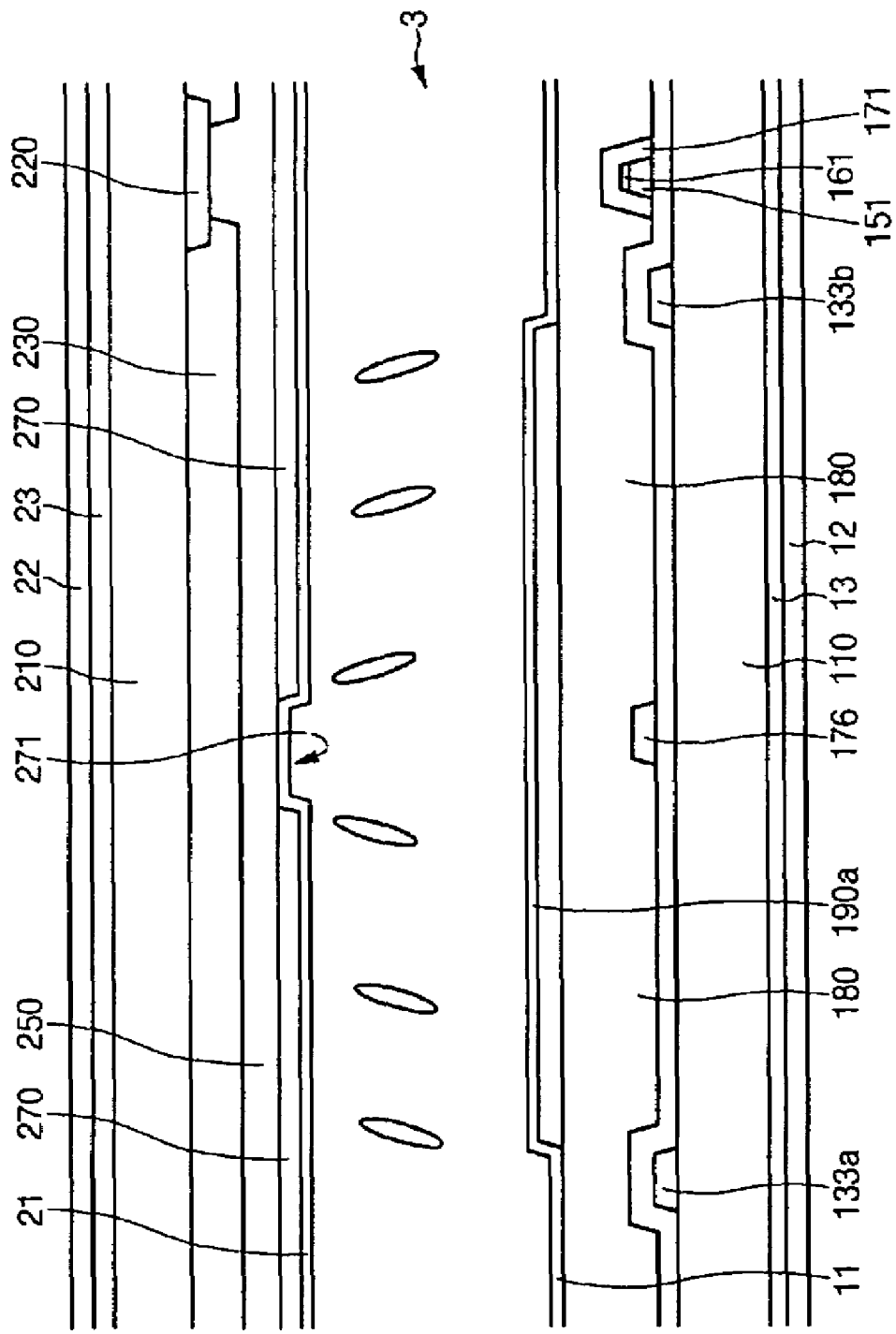

FIG. 1 is a layout view of a TFT array panel for an LCD according to an embodiment of the present invention, FIG. 2 is a layout view of a common electrode panel for an LCD according to an embodiment of the present invention, FIG. 3 is a layout view of an LCD including the TFT array panel shown in FIG. 1 and the common electrode panel shown in FIG. 2, and FIGS. 4 and 5 are sectional views of the LCD shown in FIG. 3 taken along the lines IV-IV' and V-V', respectively.

An LCD according to an embodiment of the present invention includes a TFT array panel 100, a common electrode panel 200 facing the TFT array panel 100, and a LC layer 3 interposed between the TFT array panel 100 and the common electrode panel 200.

The TFT array panel 100 is now described in detail with reference to FIGS. 1 and 3-5.

A plurality of gate lines 121 and a plurality of pairs of storage electrode lines 131a and 131b are formed on an insulating substrate 110.

The gate lines 121 for transmitting gate signals extend substantially in a transverse direction and are separated from each other. Each gate line 121 includes a plurality of projections forming a plurality of gate electrodes 124. The gate lines 121 may extend to be connected to a driving circuit (not shown) integrated on the substrate 110, or it may have an end portion (not shown) having a large area for connection with another layer or an external driving circuit mounted on the substrate 110 or on another device such as a flexible printed circuit film (not shown) that may be attached to the substrate 110.

The storage electrode lines 131a and 131b extend substantially in the transverse direction, but they are curved near the gate electrodes 124. Each pair of the storage electrode lines 131a and 131b include a plurality of pairs of storage electrodes 133a and 133b that are connected thereto and extend parallel to each other. Each storage electrode 133a or 133b is three times curved with a substantially right angle such that it includes four oblique portions making an angle of about 45 degrees with the gate lines 121 and connected in turn with a substantially right angle. The storage electrode lines 131a and 131b are supplied with a predetermined voltage such as a common voltage, which is applied to a common electrode 270 on the common electrode panel 200 of the LCD.

The gate lines 121 and the storage electrode lines 131a and 131b are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two films having different physical characteristics. One of the two films is preferably made of low resistivity metal including Al containing metal, Ag containing metal, or Cu containing metal for reducing signal delay or voltage drop in the gate lines 121 and the storage electrode lines 131a and 131b. On the other hand, the other film is preferably made of material such as Cr, Mo, Mo alloy, Ta, or Ti, which has good physical, chemical, and electrical contact characteristics with other materials such as indium tin oxide (ITO) or indium zinc oxide (IZO). Good exemplary combination of the two film materials are a pair of a lower Cr film and an upper Al (alloy) film and a pair of a lower Al (alloy) film and a Mo (alloy) film.

In addition, the lateral sides of the gate lines 121 and the storage electrode lines 131a and 131b are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131a and 131b.

A plurality of semiconductor stripes 151 preferably made of hydrogenated amorphous silicon (abbreviated as "a-Si") or polysilicon are formed on the gate insulating layer 140. Each semiconductor stripe 151 extends substantially parallel to the storage electrodes 133a and 133b such that it is curved periodically. Each semiconductor stripe 151 has a plurality of projections 154 branched out toward the gate electrodes 124 and the width of each semiconductor stripe 151 becomes large near the gate lines 121 and the storage electrode lines 131a and 131b such that the semiconductor stripe 151 covers large areas of the gate lines 121 and the storage electrode lines 131a and 131b.

A plurality of ohmic contact stripes and islands 161 and 165 preferably made of silicide or n+hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range of about 30-80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131a and 131b. Each data line 171 has an end portion 179 having a large area for contact with another layer or an external device and it includes a plurality of curved portions and a plurality of longitudinal portions such that it curves periodically. Each curved portion includes four oblique portions connected in turn to form a letter "W" and opposite ends of the curved portion are connected to respective longitudinal portions. The oblique portions of the data lines 171 make an angle of about 45 degrees with the gate lines 121, and the longitudinal portions cross over the gate electrodes 124. The length of a curved portion is about one to nine times the length of a longitudinal portion, that is, it occupies about 50-90 percents of the total length of the curved portion and the longitudinal portion.

Each drain electrode 175 includes a thin film transistor (TFT) portion and a coupling electrode 176 connected thereto. The TFT portion of the drain electrode 175 obliquely extends from a linear end portion disposed near a gate electrode 124 to an expansion having a large area for contact with another layer. The expansion of the drain electrode 175 has a chamfered corner substantially parallel to the storage electrodes 133a and 133b. Each longitudinal portion of the data lines 171 includes a plurality of projections such that the longitudinal portion including the projections forms a source electrode 173 partly enclosing a linear end portion of a TFT portion of a drain electrode 175. Each set of a gate electrode 124, a source electrode 173, and a drain electrode 175 along with a projection 154 of a semiconductor stripe 151 form a TFT having a channel formed in the semiconductor projection 154 disposed between the source electrode 173 and the drain electrode 175.

Each coupling electrode 176 of a drain electrode 175 is connected to the expansion of the drain electrode 175. The coupling electrode 176 is disposed between a pair of storage electrodes 133a and 133b and equidistant from the pair of storage electrodes 133a and 133b, and it extends substantially parallel to the storage electrodes 133a and 133b such that it has three curve points, i.e., lower, middle, and upper curve points getting away from the expansion of the drain electrode 175. The width a, b and c of the coupling electrode 176 may be different from each other and ranges preferably about 3-15 microns. The coupling electrode 176 includes a pair of transverse branches 177 extending from middle and upper curve points of the coupling electrode 176 and making an obtuse angle with other portions of the coupling electrode 176.

The data lines 171 and the drain electrodes 175 are preferably made of refractory metal such as Cr, Mo, Mo alloy, Ta and Ti. They may also have a multi-layered structure including a refractory metal film (not shown) and a low-resistivity film (not shown). A good example of the combination is a lower Mo (alloy) film, an intermediate Al (alloy) film, and an upper Mo (alloy) film as well as the above-described combinations of a lower Cr film and an upper Al (alloy) film and a lower Al (alloy) film and an upper Mo (alloy) film.

Like the gate lines 121 and the storage electrode lines 131a and 131b, the data lines 171 and the drain electrodes 175 have inclined lateral sides with respect to the surface of the substrate 110, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 and the storage electrode lines 131a and 131b as described above, to smooth the profile of the surface, thereby preventing the disconnection of the data lines 171.

A passivation layer 180 is formed on the data lines 171, the drain electrodes 175, and exposed portions of the semiconductor stripes 151, which are not covered with the data lines 171 and the drain electrodes 175. The passivation layer 180 is preferably made of low dielectric insulating material such as a-Si:C:O and a-Si:O:F formed by plasma enhanced chemical vapor deposition (PECVD), organic insulator or inorganic insulator such as silicon nitride and silicon oxide. The passivation layer 180 may have a double-layered structure including a lower inorganic film and an upper organic film in order to prevent the channel portions of the semiconductor stripes 151 from being in direct contact with organic material. The passivation layer 180 may have a position-dependent thickness.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 184 exposing the storage electrode lines 131a and 131b. The contact holes 182, 184 and 185 can have various shapes such as polygon or circle. The sidewalls of the contact holes 182, 184 and 185 are inclined with an angle of about 30-85 degrees or have stepwise profiles.

A plurality of pixel electrodes 190 including first to third subpixel electrodes 190a-190c, a plurality of contact assistants 82, and a plurality of storage overpasses 84, which are preferably made of ITO or IZO, are formed on the passivation layer 180.

Each pixel electrode 190 is located substantially in an area enclosed by the data lines 171 and the gate lines 121, and it has a pair of transverse edges extending substantially parallel to the storage electrode lines 131a and 131b and a pair of curved edges substantially parallel to the data lines 171 such that it also forms a letter "W."

The subpixel electrodes 190a-190c are divided by a pair of gaps 194 extending in the transverse direction from the lower and the upper curve points of a data line 171 such that the first and the third subpixel electrodes 190a and 190c are nearly parallelogrammic and the second pixel electrode 190b has a shape of chevron. However, the pixel electrodes 190 may be divided into a plurality of subpixel electrodes having various shapes and for example, the pixel electrodes 190 may be divided by a curved gap overlapping the coupling electrodes 176.

The first subpixel electrode 190 is physically and electrically connected to a drain electrode 175 through a contact hole 185 such that the first subpixel electrode 190a receives the data voltages from the drain electrode 175.

The second and the third subpixel electrodes 190b and 190c overlap a coupling electrode 176 to be capacitively coupled with the first subpixel electrode 190a. The second subpixel electrode 190b has a transverse cutout 193 extending from a concave vertex thereof. The position-dependent thickness of the passivation layer 180 and the position-dependent width of the coupling electrode 176 may differentiate the coupling capacitance between the first subpixel electrode 190a and the second and the third subpixel electrodes 190b and 190c.

The subpixel electrodes 190a-190c supplied with the data voltages or the voltages obtained by the capacitive coupling generate electric fields in cooperation with the common electrode 270, which determine orientations of liquid crystal molecules 310 disposed therebetween.

A subpixel electrode 190a-190c and the common electrode 270 form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the subpixel electrodes 190a-190c with the storage electrode lines 131a and 131b including the storage electrodes 133a and 133b.

The contact assistants 82 are connected to the exposed end portions 179 of the data lines 171 through the contact holes 182. The contact assistants 82 protect the exposed end portions 179 and complement the adhesion between the exposed end portions 179 and external devices. The contact assistants 82 may be omitted when the end portions 179 are omitted.

The storage overpasses 84 cross over the gate lines 121 and they are connected to a pair of the storage electrode lines 131 through the contact holes 184 disposed opposite each other with respect to the gate lines 121.

Finally, an alignment layer 11 that may be homeotropic is formed on the pixel electrodes 190, the contact assistants 82, the storage overpasses 84, and the passivation layer 180.

The description of the common electrode panel 200 follows with reference to FIGS. 2-4.

A light blocking member 220 called a black matrix is formed on an insulating substrate 210 such as transparent glass and it may include a plurality of curved portions facing the curved portions of the data lines 171 and a plurality of expanded portions facing the TFTs and the longitudinal portions of the data lines 171 such that the light blocking member 220 prevents light leakage between the pixel electrodes 190 and defines open areas facing the pixel electrodes 190.

A plurality of color filters 230 are formed on the substrate 210 and the light blocking member 220 and each of the color filters 230 is disposed substantially in the open areas defined by the light blocking member 220. The color filters 230 disposed between adjacent two data lines 171 and arranged in the longitudinal direction may be connected to each other to form a stripe. Each color filter 230 may represent one of three primary colors such as red, green and blue colors. The color filters 230 may be disposed on the TFT array panel 100, and in this case, they may be disposed under the gate insulating layer 140 or under the passivation layer 180.

An overcoat 250 preferably made of silicon nitride or organic material is formed on the color filters 230 and the light blocking member 220. The overcoat 250 protects the color filters 230 and gives a flat top surface.

A common electrode 270 preferably made of transparent conductive material such as ITO and IZO is formed on the overcoat 250. The common electrode 270 is supplied with the common voltage and it has a plurality of W-shaped cutouts 271 facing respective pixel electrodes 190.

The cutout 271 includes a curved portion that overlaps a coupling electrode 176 and has three curve points, three intermediate transverse portions 274 that extend from the curve points and make obtuse angles with the curved portion, and a pair of terminal transverse portions 272 that are connected to respective ends of the curved portion and make obtuse angles with the curved portion.

The curved portion of the cutout 271 may bisect the partitions of the pixel electrode 190 into left and right halves, and they have four rectilinear oblique portions that are connected in turn and have pairs of concave notches 273. Each pair of notches 273 face each other and disposed near a center of a rectilinear oblique portion.

The transverse portions 274 of the cutout 271 include a lower transverse portion disposed between the first subpixel electrode 190a and the second subpixel electrode 190b, a middle transverse portion overlapping the second subpixel electrode 190b and a transverse branch of a coupling electrode 176 and forming a line with a cutout of the second subpixel electrode 190b, and an upper transverse portion disposed between the second subpixel electrode 190b and the third subpixel electrode 190c and overlapping another transverse branch of the coupling electrode 176. The transverse portions 274 have different widths as shown in FIGS. 2 and 3 such that the subpixel electrodes 190a-190c have different overlapping areas with the common electrode 270 although it is optional.

The terminal transverse portions 274 of the cutout 271 are aligned with transverse edges of the pixel electrode 190, respectively. The cutout 271/272 preferably has a width W in a range of about 6-20 microns.

The light blocking member 220 may also overlap the cutouts 271 and 272 to block the light leakage through the cutouts 271 and 272.

A homeotropic alignment layer 21 is coated on the common electrode 270.

The alignment layers 11 and 21 may be homogeneous alignment layers.

A pair of polarizers 12 and 22 are provided on outer surfaces of the panels 100 and 200 such that their transmissive axes are crossed and one of the transmissive axes is parallel to the gate lines 121. In addition, a retardation film 13/23 for compensating the retardation of the LC layer 3 is disposed between the polarizer 12/23 and the outer surface of the panel 100/200.

The LCD may further include a backlight unit for providing light for the LCD.

The LC layer 3 has negative dielectric anisotropy and the LC molecules 310 in the LC layer 3 are aligned such that their long axes are vertical to the surfaces of the panels 100 and 200 in absence of electric field.

Upon application of the common voltage to the common electrode 270 and a data voltage to the pixel electrodes 190, a primary electric field substantially perpendicular to the surfaces of the panels 100 and 200 is generated. The LC molecules 310 tend to change their orientations in response to the electric field such that their long axes are perpendicular to the field direction. In the meantime, the cutouts 271 and 272 of the pixel electrodes 190 and the common electrode 270 and the oblique edges of the pixel electrodes 190 distort the primary electric field to have a horizontal component which determines the tilt directions of the LC molecules 310. The horizontal component of the primary electric field is perpendicular to the edges of the cutouts 271 and 272 and the oblique edges of the pixel electrodes 190. The horizontal component of the primary field varies depending on positions on a pixel electrode 190.

Accordingly, several sub-regions having different tilt directions, which are partitioned by outer edges of a pixel electrode 190, a cutout 271 of the common electrode 270, the gaps 194, and the transverse portions 177, and a cutout 193 of the pixel electrode 190, are formed in a pixel region of the LC layer 3, which are located on the pixel electrode 190. Each sub-region has two major edges defined by the cutout 271 and an oblique outer edge of the pixel electrodes 190a and 190b, respectively. The sub-regions are classified into a plurality of, preferably four, domains based on the tilt directions.

In the meantime, the direction of a secondary electric field due to the voltage difference between the pixel electrodes 190 is perpendicular to the edges of the pixel electrodes and the cutouts 191, 271 and 272. Accordingly, the field direction of the secondary electric field coincides with that of the horizontal component of the primary electric field in the primary domains. Consequently, the secondary electric field between the pixel electrodes 190 enhances the determination of the tilt directions of the LC molecules 310 in the primary domains.

Meanwhile, the transverse portions 177 of the coupling electrode 176 block the light leakage between the subpixel electrodes 190b and 190c and the notches 173 may give stable alignment near the boundaries of the sub-regions, thereby preventing spots or afterimages near the boundaries of the sub-regions.

Since the LCD performs inversion such as dot inversion, column inversion, etc., adjacent pixel electrodes are supplied with data voltages having opposite polarity with respect to the common voltage and thus a secondary electric field between the adjacent pixel electrodes is almost always generated to enhance the stability of the primary domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200 and it reduces the production cost.

The number, shapes, and arrangements of the cutouts 271 and the gaps 194 may be modified depending on the design factors. Moreover, the cutouts 271 may be substituted with protrusions, preferably made of organic material, and preferably having width ranging about 5-15 microns.

Figure 6:
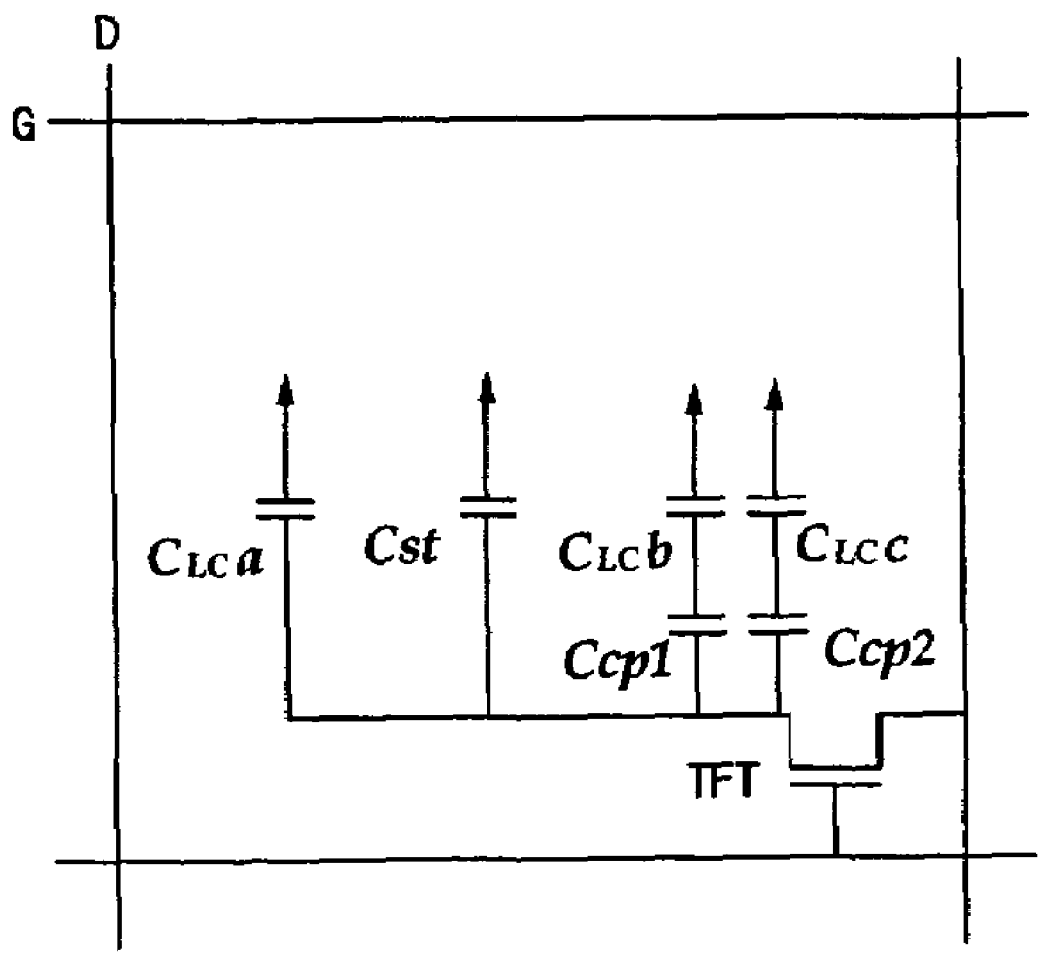
FIG. 6 is an equivalent circuit diagram of the LCD shown in FIGS. 1-5.

The LCD shown in FIGS. 1-5 is represented as an equivalent circuit shown in FIG. 6.

Referring to FIG. 6, the LCD includes a plurality of gate lines G, a plurality of data lines D, and a plurality of pixels, and each pixel includes first to third subpixels including first to third LC capacitors $C_{LC}a$-$C_{LC}C$, two coupling capacitors Ccp1 and Ccp2, a storage capacitor Cst, and a TFT Q. The TFT Q has a control terminal (gate electrode) connected to a gate line G, an input terminal (source electrode) connected to a data line D, and an output terminal (drain electrode) connected to the first LC capacitor $C_{LC}a$, a storage capacitor Cst, and the coupling capacitors Ccp1 and Ccp2. The coupling capacitors Ccp1 and Ccp2 are connected between the TFT Q and the second and the third LC capacitors $C_{LC}b$ and $C_{LC}c$. The first/second/third LC capacitor $C_{LC}a/C_{LC}b/C_{LC}c$ is formed of a first/second/third subpixel electrode 190a/190b/190c, a common electrode 270, and a region of a LC layer 300 disposed on the first/second/third pixel electrode 190a/190b/190c. The storage capacitor Cst is formed of the pixel electrode 190, a storage electrode line 131, and insulator(s) 140 and 180 interposed therebetween. The coupling capacitor Ccp1/Ccp2 is formed of a coupling electrode 176, the second/third subpixel electrode 190b/190c, and an insulator 140 interposed therebetween.

Since the second and the third LC capacitors $C_{LC}b$ and $C_{LC}c$ are coupled with the TFT Q or the first subpixel electrode 190a through the coupling capacitors Ccp1 and Ccp2, they are supplied with voltages different from a voltage applied to the first subpixel electrode 190a. The voltage of each of the second and the third LC capacitors $C_{LC}b$ and $C_{LC}c$ are lower than the voltage of the first LC capacitor $C_{LC}a$. This configuration reduces the distortion of a gamma curve of the LCD. The voltage of the second or the third LC capacitors $C_{LC}b$ and $C_{LC}c$ are adjusted by varying the overlapping areas between the coupling electrode 176 and the second or the third subpixel electrodes 190b or 190c, and preferably about 0.95-0.60 of that of the first LC capacitor $C_{LC}a$.

In addition, one of the three subpixel electrodes 190a-190c having a higher voltage preferably has an area equal to or smaller than another of the three subpixel electrodes 190a-190c having a lower voltage.

According to a simulation, it is preferable that the area of the first subpixel electrode 190a is equal to or smaller than about half of the area of the second and the third subpixel electrodes 190b and 190c, and the gap 194 has a width of about 2-5 microns. It is preferable that the area of the second and the third subpixel electrodes 190b and 190c is equal to or smaller than about 80% of the pixel electrode 190, and an absolute magnitude of a voltage of the second and the third LC capacitors $C_{LC}b$ and $C_{LC}c$ is in a range of about 60-95% of an absolute magnitude of the voltage of the first LC capacitor $C_{LC}a$. In addition, a real ratios of the second and the third subpixel electrodes 190b and 190c are about 1:1 to 1:5.

Now, the reason why the capacitive coupling makes the magnitude of the voltages of the second and the third LC capacitors $C_{LC}b$ and $C_{LC}c$ lower than that of the first pixel electrode 190a, which will be described in detail.

The voltage across the first, the second, and the third LC capacitors $C_{LC}a$, $C_{LC}b$ and $C_{LC}c$ is denoted by Va, Vb and Vc, respectively. The voltage distribution law results in:

$$Vb = Va \times [Ccp1/(Ccp+C_{LC}b)]; \text{ and}$$

$$Vc = Va \times [Ccp2/(Ccp1+C_{LC}b+Ccp2+C_{LC}c)].$$

Since Ccp1/(Ccp+$C_{LC}$b) and Ccp1/(Ccp1+$C_{LC}$b+Ccp2+$C_{LC}$c) is smaller than one, the voltages Vb and Vc is smaller than the voltage Va.

An LCD according to another embodiment of the present invention will be described in detail with reference to FIG. 7 as well as FIGS. 2-5.

Figure 7:
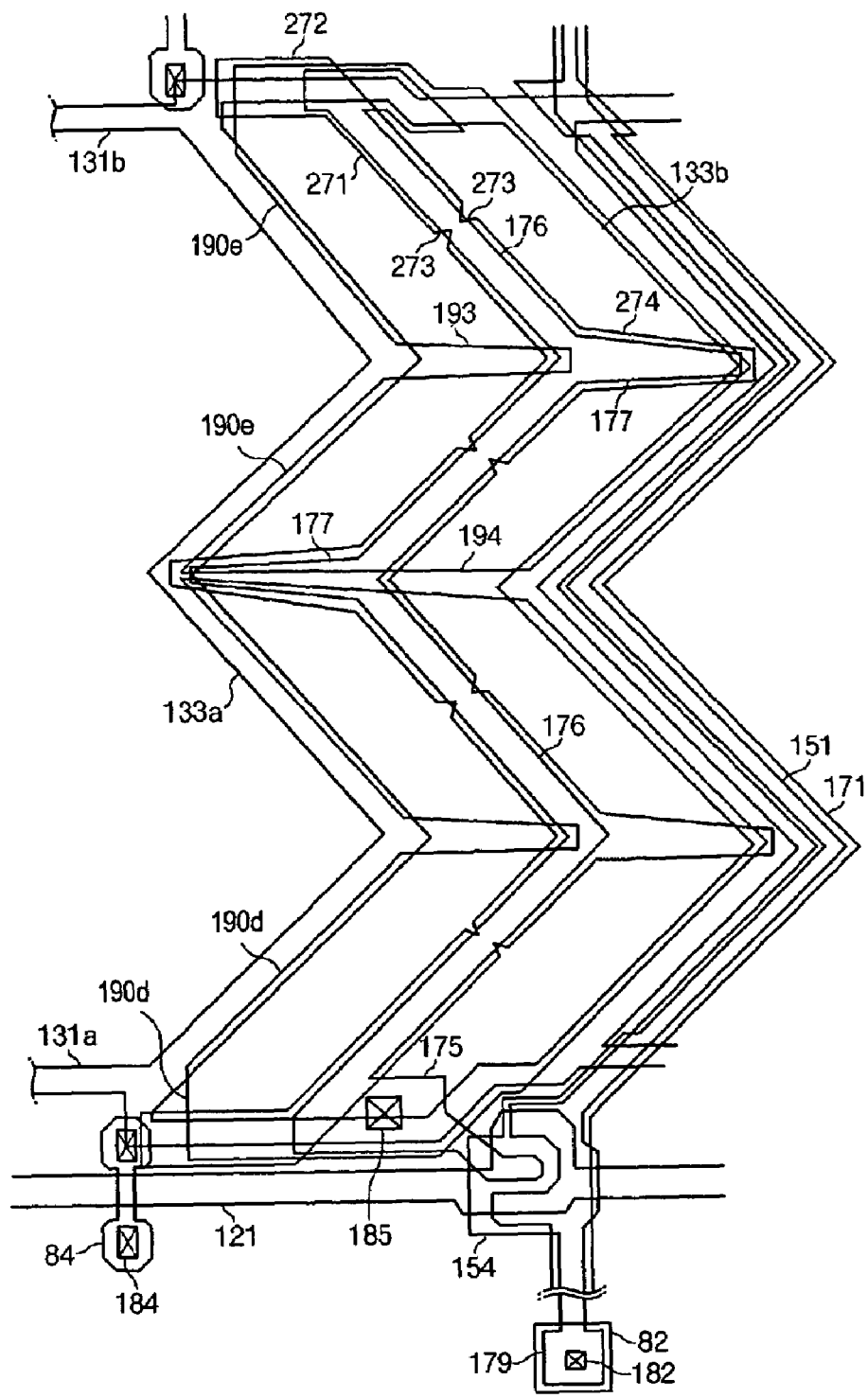
FIG. 7 is a layout view of an LCD according to another embodiment of the present invention.

FIG. 7 is a layout view of an LCD according to another embodiment of the present invention.

An LCD according to this embodiment includes a TFT array panel shown in FIG. 7, a common electrode panel 200 shown in FIG. 2, and a LC layer 3 interposed therebetween. The sectional views of FIGS. 4 and 5 may be applicable to the LCD shown in FIG. 7 with a little exception.

Layered structures of the panels 100 and 200 according to this embodiment are almost the same as those shown in FIGS. 1-5.

Regarding the TFT array panel 100, a plurality of gate lines 121 including a plurality of gate electrodes 124 and a plurality of storage electrode lines 131a and 131b including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 182, 184 and 185 are provided at the passivation layer 180 and the gate insulating layer 140. A plurality of pixel electrodes 190, a plurality of storage overpasses 84, and a plurality of contact assistants 82 are formed on the passivation layer 180 and an alignment layer 11 is coated thereon. The storage electrodes 133a and 133b are thrice curved and the data lines 171 include a plurality of curved portions, each curved portion being thrice curved. In addition, each pixel electrode 190 has two curved edges that extend substantially parallel to each other and are thrice curved to have lower, middle, and upper curve points.

Regarding the common electrode panel 200, a light blocking member 220, a plurality of color filters 230, an overcoat 250, a common electrode 270 having cutouts 271 that includes lower, middle, and upper transverse portions 274, and an alignment layer 21 are formed on an insulating substrate 210.

Different from the LCD shown in FIGS. 1-5, each pixel electrode 190 includes two chevron-shaped subpixel electrodes 190d and 190e divided by a gap 194 passing through the middle curve points of the curved edges. Each subpixel electrode 190d or 190e has a transverse cutout 193 extending from a concave vertex thereof and forming a line with a transverse portion 274 of the cutout 271 of the common electrode 270.

Many of the above-described features of the LCD shown in FIGS. 1-5 may be appropriate to the LCD shown in FIG. 7.

An LCD according to another embodiment of the present invention will be described in detail with reference to FIGS. 8 and 9.

Figure 8:
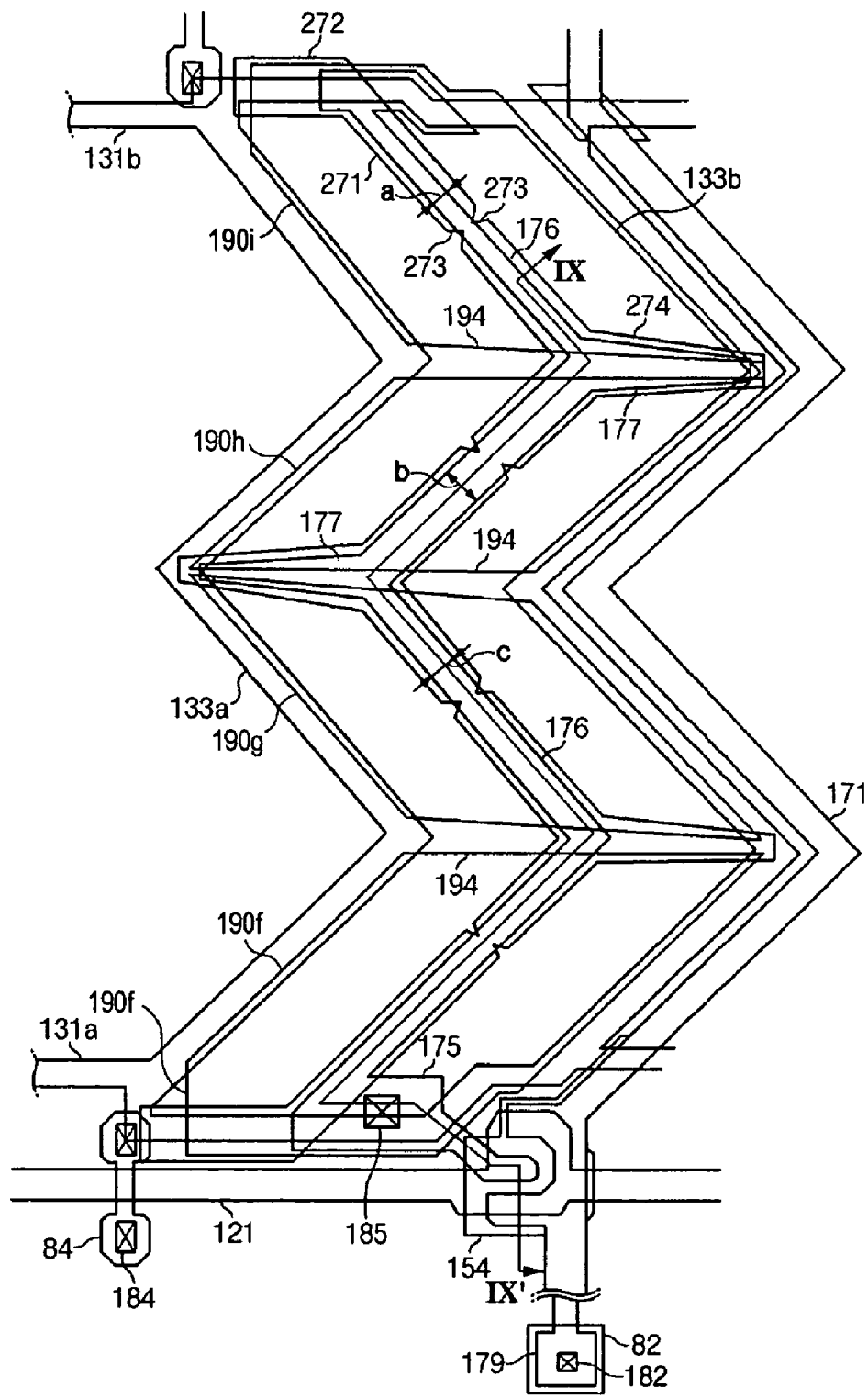
FIG. 8 is a layout view of an LCD according to another embodiment of the present invention.
Figure 9:
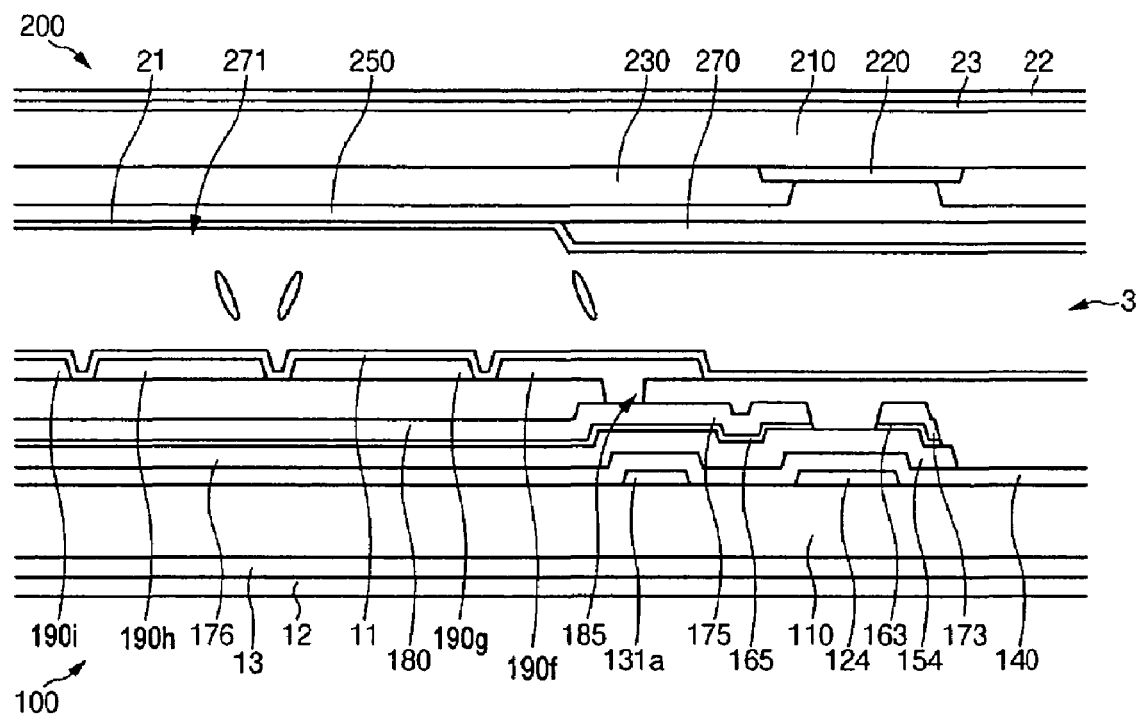
FIG. 9 is a sectional view of the LCD shown in FIG. 8 taken along the line IX-IX'.

FIG. 8 is a layout view of an LCD according to another embodiment of the present invention, and FIG. 9 is a sectional view of the LCD shown in FIG. 8 taken along the line IX-IX'.

Referring to FIGS. 8 and 9, an LCD according to this embodiment includes a TFT array panel 100, a common electrode panel 200, and a LC layer 3 interposed therebetween.

Layered structures of the panels 100 and 200 according to this embodiment are almost the same as those shown in FIGS. 1-5.

Regarding the TFT array panel 100, a plurality of gate lines 121 including a plurality of gate electrodes 124 and a plurality of storage electrode lines 131a and 131b including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 182, 184 and 185 are provided at the passivation layer 180 and the gate insulating layer 140. A plurality of pixel electrodes 190, a plurality of storage overpasses 84, and a plurality of contact assistants 82 are formed on the passivation layer 180 and an alignment layer 11 is coated thereon. The storage electrodes 133a and 133b are thrice curved and the data lines 171 include a plurality of curved portions, each curved portion being thrice curved. In addition, each pixel electrode 190 has two curved edges that extend substantially parallel to each other and are thrice curved to have lower, middle, and upper curve points.

Regarding the common electrode panel 200, a light blocking member 220, a plurality of color filters 230, an overcoat 250, a common electrode 270 having cutouts 271 that includes lower, middle, and upper transverse portions 274, and an alignment layer 21 are formed on an insulating substrate 210.

Different from the LCD shown in FIGS. 1-5, each pixel electrode 190 includes first to fourth parallelogrammic subpixel electrodes 190f-190i divided by three gaps 194 passing through the opposite curve points of the curved edges.

The subpixel electrodes 190f-190i and the common electrode 190 form respective LC capacitors and it is preferable that the sum of the voltages across the LC capacitors formed by the first and the third subpixel electrodes 190f and 190g is the same as that by the second and the fourth subpixel electrodes 190g and 190i. It is preferable that the latter to former or the former to the latter is about 80-100%. The voltages of the LC capacitors formed by the first to the third subpixel electrodes 190a-190c may be decreasing from the first subpixel electrode 190a and to the third subpixel electrode 190c.

In addition, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171, the drain electrodes 175, the semiconductors 151, and the ohmic contacts 161 and 165 using one photolithography process.

A photoresist pattern for the photolithography process has position-dependent thickness, and in particular, it has first and second portions with decreased thickness. The first portions are located on wire areas that will be occupied by the data lines 171 and the drain electrodes 175 and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-5 may be appropriate to the LCD shown in FIGS. 6-8.

Figure 10:
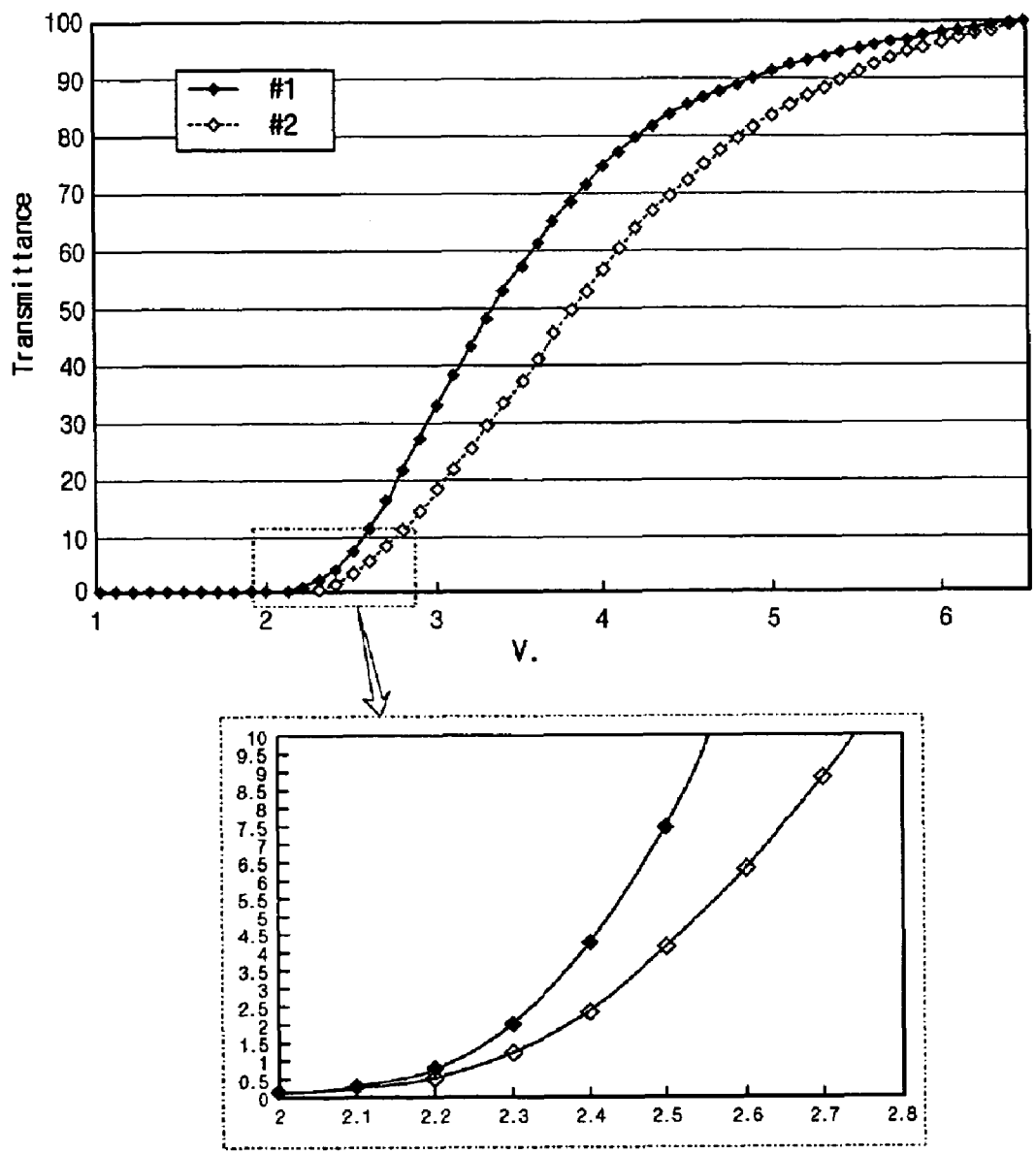
FIGS. 10 and 11 are graphs illustrating light transmittance of the LCD shown in FIGS. 7 and 3, respectively, as well as light transmittance of a conventional vertically aligned mode LCD as function of voltage applied to a liquid crystal layer.
Figure 11:
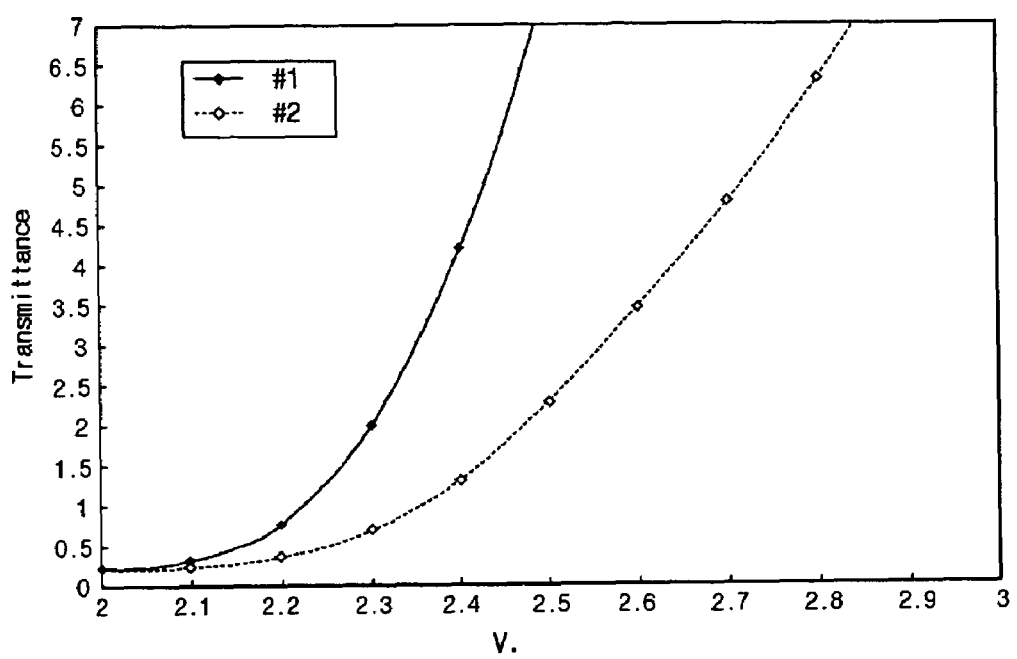

Referring to FIGS. 10 and 11, the advantages of the LCDs according to the embodiments of the present invention will be described in detail.

FIGS. 10 and 11 are graphs illustrating light transmittance of the LCD shown in FIGS. 7 and 3, respectively, as well as light transmittance of a conventional vertically aligned mode LCD as function of voltage applied to a liquid crystal layer.

In FIGS. 10 and 11, "#1" represents a transmittance curve for a convention LCD, and "#2" represents a transmittance curve for an LCD shown in FIG. 7 or 3.

As shown in FIGS. 10 and 11, the conventional LCD shows a steep curve (#1) and thus a deviation of a voltage applied to a pixel electrode for a low gray may steep variation of the light transmittance, thereby decreasing image quality. For example, driving circuit integrated circuits (IC) having little output deviations may cause voltage deviation for a given gray such that longitudinal stripes may appear in the LCD.

However, the curves (#2) shown in FIGS. 10 and 11 have smooth steepness such that the light transmittance may not be abruptly varied depending on the voltage particularly for low grays, thereby improving visibility of the LCD.

When a "steepness" of a transmittance curve is defined as a gradient between the light transmittance of 5.5% and 1.5%, i.e., (5.5%-1.5%)/(V(5.5%)-V(1.5%)) and it is preferable that the steepness of an LCD is lower than 20. The light transmittance in a range of about 5.5-1.5% is most sensitively recognized by human eyes and the variation of the light transmittance in this range due to the output deviation of the data driving IC is easily perceived as longitudinal or transverse stripes.

For an LCD shown in FIG. 7, when the ratio of the area between the first subpixel electrode 190a and the second subpixel electrode 190b is 1:1 and the ratio of the voltage across the liquid crystal capacitors formed by the first subpixel electrode 190a and the second subpixel electrode 190b is 1:0.7, the steepness was measured to be about 16, which is lower than 20.

For an LCD shown in FIG. 3, when the ratio of the area of the first, the second, and the third subpixel electrodes 190a, 190b and 190c is 1:2:1 and the ratio of the voltage across the liquid crystal capacitors formed by the first, the second, and the third subpixel electrodes 190a, 190b and 190c is 1:0.7:0.65, the steepness was measured to be about 11.5, which is very slow.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
a first panel including a first signal line, a second signal line intersecting the first signal line, a thin film transistor connected to the first and the second signal lines, and a pixel electrode connected to the thin film transistor and including a first subpixel electrode configured to receive a first voltage and a second subpixel electrode capacitively coupled to the first subpixel electrode and configured to receive a second voltage;
a second panel including a common electrode facing the pixel electrode and supplied with a common voltage; and
a vertically aligned liquid crystal layer that is interposed between the pixel electrode and the common electrode,
wherein a steepness of a light transmittance curve of display, wherein the light transmittance of the display is a function of a voltage applied to the first subpixel electrode with respect to the common voltage, is lower than about 20% light transmittance/Volt in a section of the light transmittance curve between about 1.5% light transmittance and about 5.5% light transmittance.

2. The liquid crystal display of claim 1, wherein an absolute magnitude of a first subpixel voltage defined as the first voltage relative to the common voltage is higher than an absolute magnitude of a second subpixel voltage defined as the second voltage relative to the common voltage.

3. The liquid crystal display of claim 2, further comprising a third subpixel electrode capacitively coupled to the first and the second subpixel electrodes and configured to receive a third voltage.

4. The liquid crystal display of claim 3, wherein an area of the first subpixel electrode is equal to or smaller than half of an area of the second and the third subpixel electrodes.

5. The liquid crystal display of claim 3, wherein an absolute magnitude of each of the second subpixel voltage and a third subpixel voltage defined as the third voltage relative to the common voltage is in a range of about 60-95% of an absolute magnitude of the first subpixel voltage.

6. The liquid crystal display of claim 3, wherein the second and the third subpixel electrodes occupy an area equal to or smaller than about 80% of an area of the pixel electrode.

7. The liquid crystal display of claim 3, wherein a ratio of an area of each of the second and the third subpixel electrodes relative to an area of the first subpixel electrode is about 1-5.

8. The liquid crystal display of claim 3, further comprising a coupling electrode connected to the first subpixel electrode and overlapping the second and the third subpixel electrodes for forming the capacitive coupling.

9. The liquid crystal display of claim 8, wherein the coupling electrode has first and second portions overlapping the second and the third subpixel electrodes, respectively, and the first and the second portions of the coupling electrode have different widths.

10. The liquid crystal display of claim 9, wherein overlapping areas between the coupling electrode and the second and the third subpixel electrodes are different.

11. The liquid crystal display of claim 3, further comprising a fourth subpixel electrode capacitively coupled with the first to the third subpixel electrodes and configured to receive a fourth voltage.

12. The liquid crystal display of claim 11, wherein relative value of a sum of the first subpixel voltage and the third subpixel voltage and a sum of the second subpixel voltage and a fourth subpixel voltage defined as the fourth voltage relative to the common voltage is in a range of about 80-100%.

13. The liquid crystal display of claim 11, further comprising a coupling electrode connected to the first subpixel electrode and overlapping the second to the fourth subpixel electrodes for forming the capacitive coupling.

14. The liquid crystal display of claim 13, wherein the coupling electrode has first to third portions overlapping the second to the fourth subpixel electrodes, respectively, and the first to the third portions of the coupling electrode have different widths.

15. The liquid crystal display of claim 14, wherein overlapping areas between the coupling electrode and the second to the fourth subpixel electrodes are different.

16. The liquid crystal display of claim 1, wherein the second signal line comprises a curved portion including at least two rectilinear portions alternately arranged with making clockwise and counterclockwise angles with the first signal line.

17. The liquid crystal display of claim 1, wherein the pixel electrode has a shape of curved stripes that is curved at least twice and the first subpixel electrode and the second subpixel electrode is divided at curved portions of the pixel electrode.

18. The liquid crystal display of claim 17, wherein the pixel electrode and the common electrode comprise a tilt direction determining member curved following the shape of the pixel electrode.

19. The liquid crystal display of claim 1, further comprising a storage electrode line that extends substantially parallel to the first signal line and includes a storage electrode overlapping the pixel electrode.

20. A liquid crystal display comprising:
a first panel including a first signal line, a second signal line intersecting the first signal line, a thin film transistor connected to the first and the second signal lines, and a pixel electrode connected to the thin film transistor and including a first subpixel electrode and a plurality of second subpixel electrodes separated from each other and capacitively coupled to the first subpixel electrode;
a second panel including a common electrode facing the pixel electrode and supplied with a common voltage; and
a vertically aligned liquid crystal layer that is interposed between the pixel electrode and the common electrode,
wherein the first subpixel electrode is configured to receive a first subpixel voltage and the plurality of second subpixel electrodes are configured to receive a plurality of second subpixel voltage and each of the plurality of second subpixels electrodes is configured to receive second subpixels voltages having different voltage ratios with respect to the first subpixel voltage.

21. The liquid crystal display of claim 20, wherein an absolute magnitude of each of the second subpixel voltages is lower than an absolute magnitude of the first subpixel voltage.

22. The liquid crystal display of claim 21, wherein the number of the second subpixel electrodes is two.

23. The liquid crystal display of claim 22, wherein the first subpixel electrode has an area equal to or smaller than an area of the second subpixel electrodes.

24. The liquid crystal display of claim 22, wherein the absolute magnitude of each of the second subpixel voltages is in a range of about 60-95% of an absolute magnitude of the first subpixel voltage.

25. The liquid crystal display of claim 22, wherein the second subpixel electrodes occupy an area equal to or smaller than about 80% of an area of the pixel electrode.

26. The liquid crystal display of claim 22, wherein a ratio of an area of each of the second subpixel electrodes relative to an area of the first subpixel electrode is about 1-5.

27. The liquid crystal display of claim 22, further comprising a coupling electrode connected to the first subpixel electrode and overlapping the second subpixel electrodes for forming the capacitive coupling.

28. The liquid crystal display of claim 27, wherein the coupling electrode has a plurality of portions overlapping the second subpixel electrodes, respectively, and having different widths.

29. The liquid crystal display of claim 28, wherein overlapping areas between the coupling electrode and the second subpixel electrodes are different.

30. The liquid crystal display of claim 20, wherein the number of the second subpixel electrode is three.

31. The liquid crystal display of claim 30, further comprising a coupling electrode connected to the first subpixel electrode and overlapping the second subpixel electrodes for forming the capacitive coupling.

32. The liquid crystal display of claim 31, wherein the coupling electrode has a plurality of portions overlapping the second subpixel electrodes, respectively, and having different widths.

33. The liquid crystal display of claim 32, wherein overlapping areas between the coupling electrode and the second subpixel electrodes are different.

34. A liquid crystal display comprising:

a first panel including a first signal line, a second signal line intersecting the first signal line, a thin film transistor connected to the first and the second signal lines, and a pixel electrode connected to the thin film transistor and including a plurality of subpixel electrodes separated from each other;

a second panel including a common electrode facing the pixel electrode and supplied with a common voltage; and a vertically aligned liquid crystal layer that is interposed between the pixel electrode and the common electrode, wherein the first and second subpixel electrodes are configured to receive different voltages and at least one of the plurality of second subpixel electrodes is configured to receive a first magnitude voltage and has an area equal to or smaller than another of the plurality of second subpixel electrodes, wherein the another second subpixel electrode is configured to receive a voltage having a smaller magnitude than the first magnitude voltage.

* * * * *